March 18, 1930. W. E. NOBBE 1,751,051
LAMINATED GLASS AND METHOD FOR PRODUCING THE SAME
Filed Jan. 28, 1928
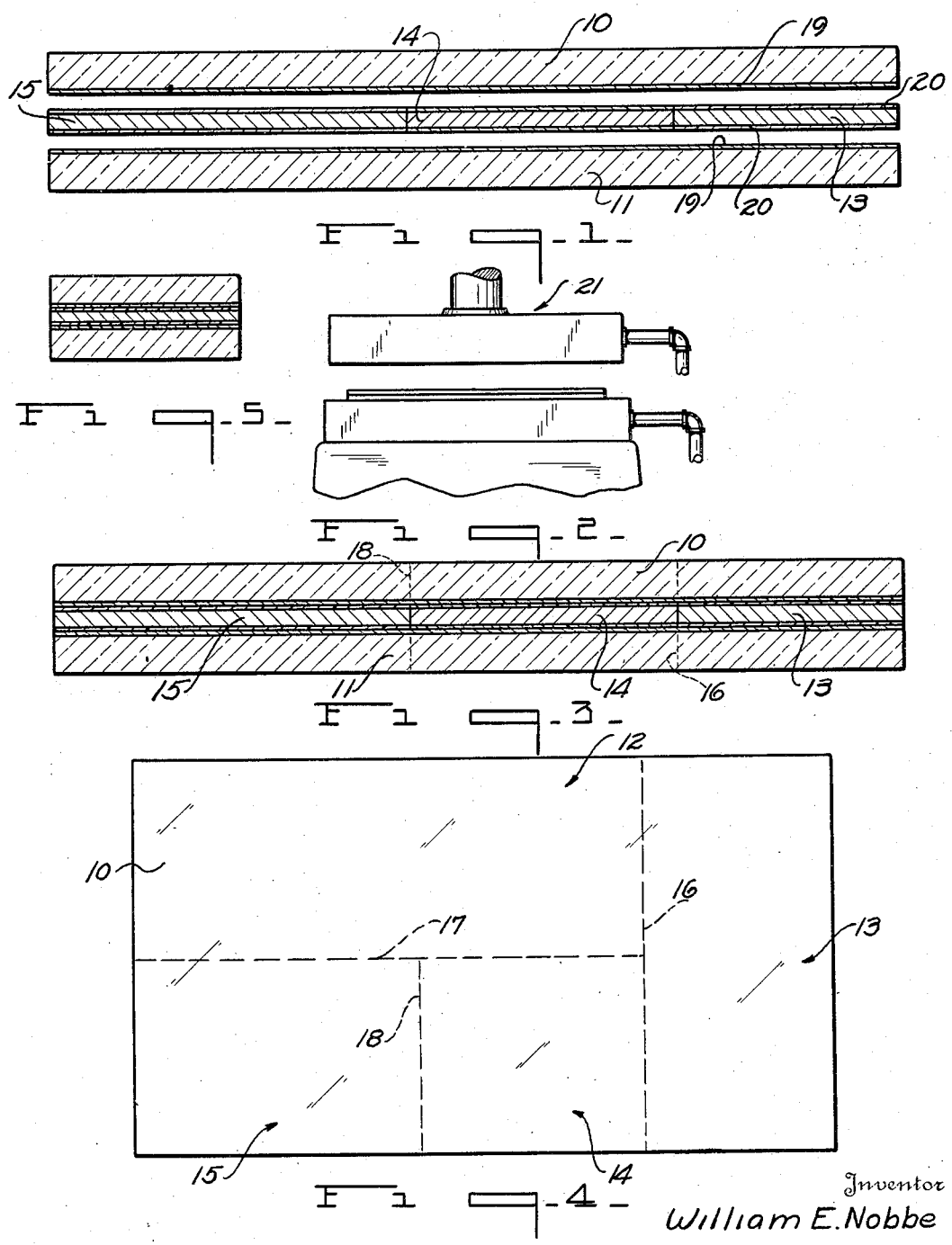
Inventor
William E. Nobbe
By Frank Fraser
Attorney Patented Mar. 18, 1930

1,751,051

UNITED STATES PATENT OFFICE

WILLIAM E. NOBBE, OF TOLEDO, OHIO, ASSIGNOR TO LIBBEY-OWENS GLASS COMPANY, OF TOLEDO, OHIO, A CORPORATION OF OHIO

LAMINATED GLASS AND METHOD FOR PRODUCING THE SAME

Application filed January 28, 1928. Serial No. 250,128.

The present invention relates to laminated glass and more especially to an improved method for making the same.

An important object of the invention is to provide an improved method for producing laminated glass which will greatly simplify, speed-up or otherwise facilitate the manufacture thereof.

Another object of the invention is the provision of an improved method for producing laminated glass whereby the cutting of a relatively large sheet into a plurality of relatively smaller individual sheets may be more readily and quickly accomplished than heretofore.

Another object is to provide such a method for making laminated glass wherein a plurality of relatively small individual sheets may be simultaneously produced in the form of a single relatively large sheet or unitary structure, the large single sheet being then cut up to provide the several smaller individual sheets.

Another object is to provide such a method of herein described character, wherein a plurality of relatively small individual sheets of non-brittle material are interposed between preferably two large sheets of glass, the non-brittle sheets of material being arranged side by side and their meeting edges defining lines of division along which the laminated sandwich is to be subsequently cut.

A further object is to provide such a method of the herein described character, wherein a plurality of relatively small individual sheets of non-brittle material are interposed between preferably two large sheets of glass and arranged edge to edge, the glass sheets and sheets of non-brittle material being then united, and the glass sheets subsequently cut between adjacent non-brittle sheets and preferably along lines coincident with the edges thereof.

A somewhat more specific yet important object is the provision of such a method of the herein described nature wherein the combined areas of the several smaller individual sheets of non-brittle material are substantially equal to that of the larger sheets of glass so that when the sheets of non-brittle material are interposed between the said sheets of glass, their outer edges will be flush with the edges thereof and their adjacent edges abutting or substantially abutting one another, the laminated sandwich being subsequently cut in a manner to provide a plurality of relatively small composite sheets of a size equal to the size of the several individual sheets of non-brittle material.

Other objects and advantages of the invention will become more apparent during the course of the following description when taken in connection with the accompanying drawings.

In the drawings forming a part of this application and wherein like numerals are employed to designate like parts throughout the same:

Figure 1 is a transverse section showing the arrangement of the sheets of glass and sheets of non-brittle material prior to the uniting thereof.

Figure 2 is a diagrammatic view of one type of press which may be used to unite the several laminations.

Figure 3 is a view similar to Figure 1 but showing the sheets united.

Figure 4 is a top plan view of Figure 3, and

Figure 5 is a section showing one of the finished smaller sheets after being cut from the large sheet.

Briefly speaking, in the production of laminated glass, in accordance with the present invention, a plurality of individual sheets of non-brittle material are interposed preferably between two relatively larger sheets of glass, the said individual sheets of non-brittle material being arranged side by side with their adjacent edges preferably abutting or substantially abutting one another. The glass sheets are then adapted to be united with the several individual sheets of non-brittle material simultaneously to form a large composite sheet or unitary structure after which the glass sheets are cut between the adjacent non-brittle sheets of material so as to produce a plurality of individual composite sheets. Prior to the uniting of the several sheets however, the adjacent surfaces thereof are preferably coated with a suitable bonding material to aid in the uniting thereof.

In the drawings, the numerals 10 and 11 designate two relatively large sheets of glass between which are adapted to be interposed a plurality of relatively smaller individual sheets of non-brittle material which may be of a cellulose composition material or the like. While any suitable number and size of non-brittle sheets may be used, four have been herein shown by way of illustration and are designated 12, 13, 14 and 15. As shown, the sheets of non-brittle material are arranged side by side with their adjacent edges preferably abutting or substantially abutting one another. While as stated, any number of sheets of non-brittle material may be used, they are preferably of such sizes that their combined areas are substantially equal to that of the glass sheets so that when the sheets of non-brittle material are arranged therebetween, their outer edges will be flush with the edges of the said sheets of glass and their adjacent edges in a substantially abutting relation as shown. The meeting edges of the sheets of non-brittle material define the lines of division along which the laminated sandwich is to be subsequently cut, as indicated at 16, 17 and 18 in Figure 4.

Each sheet of glass 10 and 11 preferably carries thereon a coating or film 19 of a suitable bonding material, applied thereto in any desired manner, while the opposite surfaces of the sheets of non-brittle material may be also covered with a similar coating as at 20, these coatings or films assisting in the uniting of the glass sheets and sheets of non-brittle material.

In carrying the present invention into practice, the individual sheets of non-brittle material are first interposed between the two sheets of glass and arranged in the manner above described. After the sheets have been thus properly arranged and the surfaces covered with a suitable bonding material, the said sheets may be placed within a press designated in its entirety by the numeral 21 (Figure 2) and united preferably under the combined action of heat and pressure.

After the several laminations have been preferably united, it will be apparent that there is provided a single large composite sheet as shown in Figure 3. The glass sheets 10 and 11 are then adapted to be cut or scored between the adjacent sheets of non-brittle material and more specifically along the lines 16, 17 and 18 which are coincident with the edges of the sheets of non-brittle material. In other words, the large composite sheet is cut into a plurality of relatively smaller sheets of the same size as the several individual sheets of non-brittle material. One of the small composite sheets is shown in Figure 5.

It is well known that it has heretofore been customary and in fact essential to produce laminated glass to size due to the difficulty encountered in and the impracticability of cutting the same. Consequently, it has heretofore been feasible to produce only a single sheet at a time. By employing the method herein provided, however, it is possible to produce a plurality of sheets of laminated glass simultaneously, these sheets being made initially in the form of a large single sheet which may, due to the novel arrangement of the sheets of non-brittle material, be subsequently cut up into a plurality of relatively smaller sheets. This can be easily and quickly accomplished since it is not necessary to cut through the sheets of non-brittle material.

Also, in view of the fact that the outer edges of the sheets of non-brittle material are arranged flush with the edges of the glass sheets and the adjacent edges of the said sheets of non-brittle material abut or substantially abut one another, the number of cuts necessary to be made in order to properly divide the single large sheet into the plurality of smaller sheets is reduced to a minimum. In fact, in the case herein illustrated, it is only necessary to cut the glass sheets along the three lines 16, 17 and 18 to produce the four finished sheets 12, 13, 14 and 15. Moreover, due to the novel manner of arranging the sheets of non-brittle material with respect to the glass sheets, no trimming up of the edges of the individual sheets is necessary after they have once been cut. It is believed that the advantages to be derived from the present invention will be readily apparent to those skilled in the art.

It is to be understood that the form of the invention herewith shown and described is to be taken as the preferred embodiment of the same, and that various changes in the shape, size and arrangement of parts may be resorted to without departing from the spirit of the invention or the scope of the subjoined claims.

I claim:

1. The method of producing laminated glass, which consists in interposing a plurality of individual sheets of non-brittle material between two relatively larger sheets of glass and arranging the said individual sheets of non-brittle material side by side, uniting the glass sheets with the individual sheets of non-brittle material simultaneously, and in then cutting the glass sheets between the adjacent sheets of non-brittle material.

2. The method of producing laminated glass, which consists in interposing a plurality of individual sheets of non-brittle material between two relatively larger sheets of glass and arranging the said individual sheets of non-brittle material side by side with their adjacent edges in abutting relation uniting the glass sheets with the individual sheets of non-brittle material simultaneously, the abutting edges of the adjacent sheets of non-brittle material defining lines of division along which the glass sheets are to be subsequently cut, and in then cutting the glass sheets along these lines of division.

3. The method of producing laminated glass, which consists in interposing a plurality of individual sheets of non-brittle material between two relatively larger sheets of glass, arranging the sheets of non-brittle material side by side so that their outer edges will be flush with the edges of the glass sheets and their adjacent edges in abutting or substantially abutting relation, uniting the glass sheets with the individual sheets of non-brittle material simultaneously, and in then cutting the glass sheets between the adjacent sheets of non-brittle material.

Signed at Toledo, in the county of Lucas and State of Ohio, this 26th day of January 1928.

WILLIAM E. NOBBE.